Jan. 3, 1933. B. J. SWEENEY 1,893,254

PRESSURE REDUCING VALVE

Filed July 28, 1931

Inventor:
Bernard J. Sweeney,
by Charles S. Gooding,
Atty.

Patented Jan. 3, 1933

1,893,254

UNITED STATES PATENT OFFICE

BERNARD J. SWEENEY, OF MALDEN, MASSACHUSETTS

PRESSURE REDUCING VALVE

Application filed July 28, 1931. Serial No. 553,497.

This invention relates to a pressure reducing valve.

The object of the invention is to provide a diaphragm type valve of the character mentioned which is simple in character and effective in its operation and which is particularly adapted to be employed in connection with cold water service to reduce the pressure of the water inside a house.

Another object of the invention is to provide a valve in which the movable valve member is positively held against the valve seat, the latter, furthermore, being constructed in such a manner that it may be removed and replaced without it being necessary to change the setting of the valve.

The invention consists in a diaphragm type pressure reducing valve as set forth in the following specification and particularly as pointed out in the claim thereof.

Referring to the drawing.

Like numerals refer to like parts throughout the several views of the drawing.

Figure 1:
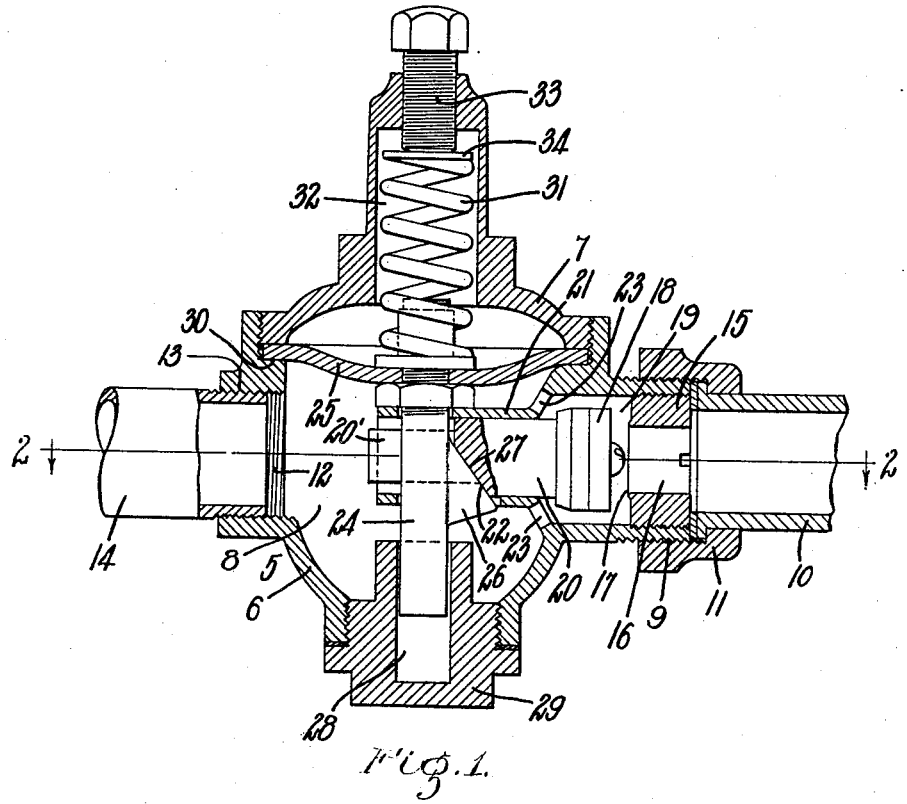
Figure 1 represents a central vertical section through a pressure reducing valve embodying my invention.
Figure 2:
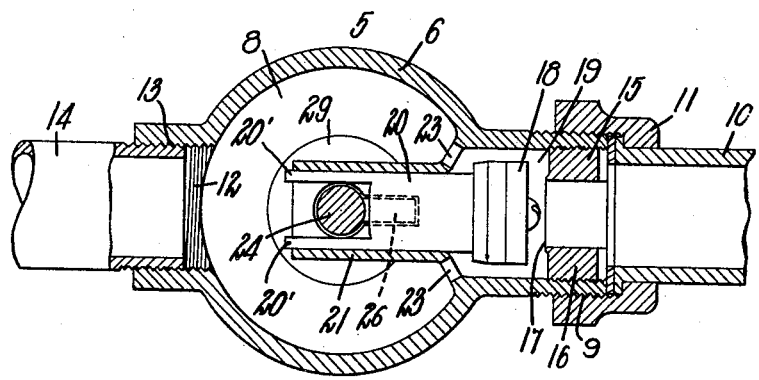
Fig. 2 is a horizontal section taken on the line 2—2, Fig. 1.

In the drawing, 5 represents a valve casing embodying therein a body member 6 and a top member 7, the latter having screw-threaded engagement with the body member and normally closing an opening in the top of said member through which access may be had to a chamber 8 provided in the body member. The body member 6 is externally screw-threaded at 9 in order that an inlet pipe 10 may be secured thereto by means of a union 11. The body member 6 is furthermore provided with an outlet passage 12 which is internally threaded at 13 to receive a discharge pipe 14. Detachably mounted in the body member 6 adjacent to the point where the inlet pipe 10 is connected to said body member is a sleeve 15 having an inlet passage 16 extending therethrough and having a valve seat 17 formed upon its inner face surrounding the passage 16.

Loosely mounted within an auxiliary chamber 19 which is provided upon the inlet side of the body member 6 is a movable valve member 18 which is adapted to engage the valve seat 17 in a manner to close the passage 16. The valve member 18 has a cylindrical reduced portion 20 formed thereon which is adapted to slide loosely within a tubular bearing portion 21 which is formed integral with the body member 6 of the casing 5, and the longitudinal median line of the bearing 21 is coincidental with the axis of the movable valve member 18 and the longitudinal median line of the inlet passage 16.

The cylindrical portion 20 of the valve member 18 is slotted to provide furcations 20' thereon which straddle the valve operating member 24 in a manner to prevent said valve member 18 from rotating in the bearing portion 21, and a bevel surface 22 is formed on the valve member 18 between the furcations 20' for a purpose hereinafter to be described. A plurality of holes 23 are provided in the body member 6 to permit a fluid entering the auxiliary chamber 19 through the inlet passage 16 to pass to the main chamber 8.

In the normal operation of the valve, the movable valve member 18 is opened by the pressure of the fluid entering the valve through the inlet passage 16. The valve member is actuated to close the inlet passage 16 by means of a valve operating member 24 which is loosely mounted to slide in the bearing 21 and is securely clamped to a flexible diaphragm 25 which, in turn, is clamped to the body member 6 by means of the top member 7. The member 24 has a laterally projecting portion 26 formed integral therewith which constitutes a wedge and which is provided with a cam surface 27 which is adapted to contact with the bevelled portion 22 of the movable valve member 20 to force the latter against the valve seat 17. The lower end portion of the valve operating member 24 projects into an opening 28 provided in a screw plug 29 which is detachably secured at the bottom of the body member 6, the plug constituting a guide for the member 24.

The diaphragm 25 rests upon a seat 30 that is formed upon the body member 6 and is clamped tightly against this seat by means of the top member 7. The diaphragm 25 is forced downwardly by means of a spring 31, the tension of which is varied by means of an adjusting screw 33, the lower extremity of said screw engaging a washer 34 that is interposed between the adjacent extremities of the screw and spring.

The action of the valve is as follows:—The valve is set to close at a certain predetermined pressure by means of the adjusting screw 33. Water, or any other suitable fluid, passes through the valve entering the casing through the inlet pipe 10 and inlet passage 16 and passing around the movable valve member 18, thence through the openings 23 into the main chamber 8 and passing outwardly therefrom through the discharge pipe 14. During this time the positions of the diaphragm 25, valve operating member 24 and movable valve member 18 are as illustrated in Fig. 1, the flow of water holding the valve member 18 in its open position.

If, however, the pressure within the valve reaches a point in excess of that at which the valve is set, the diaphragm 25 will be moved upwardly against the tension of the spring 31, thereby moving the valve operating member 24 upwardly causing the cam surface 27 to co-operate with the bevelled surface 22 of the member 18, forcing the latter laterally of the axis of the member 24 into engagement with the valve seat 17, thereby closing the valve against the admission of water or other fluid through the passage 16, and the valve will remain closed until the pressure within the chamber 8 is reduced, when the diaphragm 25 and member 24 will again drop and permit the valve member 18 to withdraw from the valve seat 17.

It will be noted that when the valve mechanism is operated to force the movable valve member against the seat 17, that the valve member will be positively held against said seat by the engagement of the surface 27 of the valve operating member 24 with the bevelled surface 22 of the valve member 18, and as long as the pressure within the chamber 8 is sufficient to force the diaphragm 25 upwardly, the valve operating member will remain in engagement with the movable valve member 18 and hold the latter positively against the seat 17.

I claim:

A pressure reducing valve having, in combination, a casing provided with a chamber therein having a discharge passage leading therefrom, a sleeve detachably mounted in said casing having a valve seat formed thereon and provided with an inlet passage extending therethrough communicating with said chamber, a bifurcated valve member adapted to engage said valve seat and provided with a bevelled surface thereon, a diaphragm clamped within the casing, a valve operating member mounted upon said diaphragm and projecting between the furcations of said valve member and embodying therein a wedge adapted to engage the bevelled surface of the valve member and force the latter against the valve seat, a spring normally acting upon the diaphragm to permit the valve member to remain in its open position, and means to vary the tension of said spring.

In testimony whereof I have hereunto set my hand.

BERNARD J. SWEENEY.